(12) United States Patent
Happel

(10) Patent No.: US 7,617,796 B2
(45) Date of Patent: Nov. 17, 2009

(54) MILKING CLAW

(76) Inventor: Werner Happel, Muehlweg 4a, 87654 Friesenried Bundesrepublik (DE)

( * ) Notice: Subject to any disclaimer, the term of this patent is extended or adjusted under 35 U.S.C. 154(b) by 124 days.

(21) Appl. No.: 11/402,877

(22) Filed: Apr. 13, 2006

(65) Prior Publication Data

US 2006/0254524 A1 Nov. 16, 2006

(30) Foreign Application Priority Data

Apr. 13, 2005 (DE) .................. 10 2005 017 094

(51) Int. Cl.
*A01J 5/00* (2006.01)
(52) U.S. Cl. .................................. 119/14.54
(58) Field of Classification Search .............. 119/14.54, 119/14.55; D30/199
See application file for complete search history.

(56) References Cited

U.S. PATENT DOCUMENTS

| | | | | |
|---|---|---|---|---|
| 1,155,131 A | * | 9/1915 | Cockburn | 119/14.37 |
| 1,552,538 A | * | 9/1925 | Brayshaw | 137/105 |
| 2,737,924 A | * | 3/1956 | Merritt et al. | 119/14.55 |
| 3,776,196 A | * | 12/1973 | Luiz, Joseph W. | 119/14.36 |
| 4,231,323 A | | 11/1980 | Olander | |
| 4,365,589 A | * | 12/1982 | Phillips et al. | 119/14.02 |
| 4,671,209 A | * | 6/1987 | Whittlestone et al. | 119/14.55 |
| 4,907,535 A | * | 3/1990 | Matsuzawa et al. | 119/14.55 |
| 5,590,622 A | * | 1/1997 | Wilson et al. | 119/14.54 |
| 5,829,381 A | | 11/1998 | Nijkamp et al. | |
| 6,298,807 B1 | * | 10/2001 | Terwilleger | 119/14.16 |
| 2005/0223999 A1 | | 10/2005 | Maier Jr. et al. | |

FOREIGN PATENT DOCUMENTS

| | | | |
|---|---|---|---|
| CH | 660444 A5 | * | 4/1987 |
| DE | 29 21 373 | | 11/1979 |
| DE | 30 35 444 A1 | | 5/1982 |
| DE | 31 40 543 A1 | | 4/1983 |
| DE | 91 12 368.2 | | 4/1992 |
| DE | 94 05 916.0 | | 7/1994 |
| DE | 695 04 814 T2 | | 11/1999 |
| DE | 102 07 955 A1 | | 9/2003 |
| JP | 02057132 A | * | 2/1990 |
| JP | 04335840 A | * | 11/1992 |

* cited by examiner

*Primary Examiner*—Son T. Nguyen
(74) *Attorney, Agent, or Firm*—Oliff & Berridge, PLC

(57) ABSTRACT

A milking claw for a milking unit is disclosed, wherein the milking claw has a tube section to which two end sections are attached. The longitudinal axis of the tube section runs roughly in the horizontal direction, i.e. roughly in the longitudinal direction of the animal or roughly parallel with the standing base of the animal. This longitudinal axis is in turn arranged essentially parallel with or slightly inclined to a connection axis of a milk outlet connection. Because of this orientation of the milk outlet connection relative to the longitudinal axis of the milking claw, swirl-free feeding and discharge of the milk can be guaranteed.

13 Claims, 5 Drawing Sheets

MILKING CLAW

The invention relates to a milking claw for a milking unit according to the preamble of claim 1.

Such milking units are used, for example, for milking cows, goats or sheep, where milking or teat cups are connected to the udder teats, these cups being connected by a short milk hose to inlet connections of a milking claw, from which the milk is discharged into a long milk hose via a milk outlet connection. The main problem associated with mechanical milking lies in the fact that the sensitive teats and udders of the animal must be treated as gently as possible to obtain high yields permanently during a large number of lactations. The milking unit supplied by the applicant under the brand name VE® milking system has proved extremely gentle in this respect, avoiding permanent stagnation of blood in the teats due to vacuum relief in the stress-relief phase with simultaneous active back massage. As a result of this load relief the sensitive teat tissue is given a short recovery phase, thus permanently reducing the risk of teat hardening and haematomas. It was demonstrated that the natural bacteria barrier in the teat canal is spared using this method and is maintained so that high milk quality can be guaranteed.

A milking claw of the type already mentioned is disclosed, for example, in DE 695 04 814 T2. This milking claw has a roughly pot-shaped milk collection tank in whose dome-shaped upper cover a plurality of milk inlet connections and pulse nozzles are formed. The associated milking cut can be loaded with normal pressure by one of the pulse nozzles during the stress-relief phase in order to deform the teat rubber radially inwards. As a result of this collapse of the rubber teat wall there is at the same time active pressure massage of the teat. The milk collected in the milk collection tank is discharged via a central milk outlet connection arranged in a base of the milking claw. Similar solutions are also disclosed in DE OS 29 21 373, DE 30 35 444 A1 and DE 102 07 955 A1.

In order to improve the flow guide inside the milking claw, the milk outlet connection and, if necessary, also the milk inlet connection can open roughly in the tangential direction into the milk collection space of the milking claw. Such solutions are indicated in DE 31 40 543 A1 and G 91 12 368.

The milking claws according to the solutions described above are frequently manufactured by the injection moulding process, which requires extremely expensive tools because of complex geometry of the claws. A further disadvantage of the solutions of prior art is that the milk is swirled as it flows through the milking claw and is subjected to increased mechanical loading during the deceleration and acceleration of the milk flow that take place, resulting in foaming and disintegration of fat particles in the milk. To avoid such mechanical loading of the milk comparatively complex devices must be provided in the solutions of prior art to guide the milk flow, as described, for example, in the aforementioned G 91 12 368 and G 94 05 916.

On the other hand the object of the invention is to provide a milking claw which reduces the mechanical loading of the milk as it flows through the claw in a comparatively simple structure.

This object is achieved by a milking claw with the characteristics of claim 1.

According to the invention a milk collection space in the milking claw is limited in sections by a length of pipe whose longitudinal axis extends in the milking position roughly in the horizontal direction, i.e. roughly parallel with the longitudinal axis of the animal. Because of this length of pipe the milking claw can be constructed extremely simply. Here mechanical loading of the milk is reduced compared to the conventional solutions due to the simple flow guide, the feed of the milk via the milk inlet connections from the top and the flow through the milking claw roughly in the horizontal direction, in which solutions the milk is introduced radially or tangentially into the milk collection space extending roughly in the vertical direction, impacts against the comparatively small area base of the milking claw underneath, and is then discharged diverted in the horizontal direction.

The flow guide is further optimised if the longitudinal axis of the tube section in the milking position is arranged above the opening of a milk outlet connection into the milk collecting space.

Thereby, it is preferred, if the base of the pipe extends roughly flush with the base area of the milk outlet connection.

In a particularly preferred embodiment of the invention the axis of the milk outlet connection extends in the milking position approximately in a parallel direction underneath the longitudinal axis of the tube section. Here an adjusting angle of up to 30° between the longitudinal axis of the tube section and the axis of the milk outlet connection is covered by the term "approximately".

According to the invention the tube section need not be constructed with a circular cross-section. It can also be constructed in a different geometry, for example as an oval pipe.

It has proved particularly advantageous for the axial length of the tube section to be greater than its diameter.

The front sides of the milking claw limiting the milk collection space are formed in a particularly preferred solution by roughly dome-shaped end pieces which are mounted preferably detachably on the tube section.

Here the milk inlet connections can open into the central tube section and/or into the two end pieces.

This opening region is preferably located in a region of the surface area of the milking claw that is open in the milking position, i.e. lies above the central horizontal plane (milking plane).

In am embodiment according to the invention a milk inlet connection opens into each of the two end pieces.

The two end pieces may be of transparent design so that the milk flow in the milking claw is visible.

To optimise the milk flow, flow guiding elements can be formed in the milk collection space, which elements serve to standardise the milk flow and/or to avoid the intersection of partial milk flows from each of the milk inlet connections to the common milk outlet, or via which the milk flow is guided along the end pieces.

Assembly of the end pieces is particularly simple if they are clamped by means of one or more tension rods against the tube section. These tension rods may also be used as a support for the flow guide elements. In a preferred embodiment an end piece constructed with the milk outlet connection located below the axis of the tube section, whilst an air inlet nozzle may be formed on the other end piece.

According to the relative position in which the milking claw is aligned to the animal, it may be advantageous for the end pieces to be arranged interchangeably on the tube section so that the milking claw can be adapted to peculiarities of different animal breeds. For example, in some breeds of cows the rear teats are closer together than the front teats, with the result that the introduction of the milk hoses into the milking claw is adapted to the particular teat position to optimise the weight distribution when fitting the milking unit. Normally the milk outlet connection of the milking claw is orientated so that the milk flows off in a forward direction (relative to the animal). In certain milking parlours (side-by-side milking parlour), however, it is preferable for the milk to be discharged to the rear so that the milking claw can then be adapted accordingly by converting the two end pieces. If the milking claw is simply rotated, it would no longer be adapted to the special relative teat arrangement because of its geometry. Furthermore, the positioning of the milking cups is improved in terms of the particular udder geometry.

In a preferred embodiment pulse nozzles are also fastened to the tube section for connecting pulsation hoses. These nozzles are preferably fastened centrally on the top of the jacket of the tube section. Here it is preferable for the axis of the pulse connection nozzles to run roughly parallel with the axis of the milk inlet connection so that there is a symmetrical introduction of forces through the short milk hoses and the short pulse hoses.

The weight distribution of the milking unit can be further optimised if the milk inlet connections are provided with a preferably adjustable stop which limits the mounting length of the short milk hoses. For example, the mounting length of the short milk hoses associated with the front teats may be slightly reduced by means of these adjustable stops so that the milking claw is inclined slightly in relation to the longitudinal axis of the animal and the milk flow toward the milk outlet connection is supported.

Preferred designs of the invention constitute the object of further sub-claims.

Preferred embodiments of the invention are explained in greater detail in the following with reference to diagrammatic drawings, where:

The following figures each show a milking claw 1 of a milking system for milking cows. However, the concept according to the invention may also be used for milking systems for milking other animals, for example goats or sheep. Milking claw 1 shown, of a milking system, is connected by four short milk hoses to a milking cut fitted on a teat. A teat rubber, which bounds an intermediate milking cup space with a milking cup wall, is received in this milking cup, which space is connected by short pulsation hoses to the milking claw. The intermediate milking cup space can be loaded with an excess pressure through these short pulsation hoses in the load relief phase connecting to the suction phase, so that the teat rubber is placed around the teat as far as the teat attachment and the blood sucked in is back massaged. By lowering the vacuum on the teat tip, this can be released after each suction phase and is not gripped by the collapsing teat rubber. Moreover, an extremely good perfusion of the teat tissue is achieved by pressure massaging the teat.

The short pulsation hoses are connected by milking claw 1 and long pulse hoses to a pulsator for controlling the pressure in the intermediate milking cup space (pulsation. The milk is drawn off from the milking claw via a long milk hose, and fed to a tank or the like.

Figure 1:
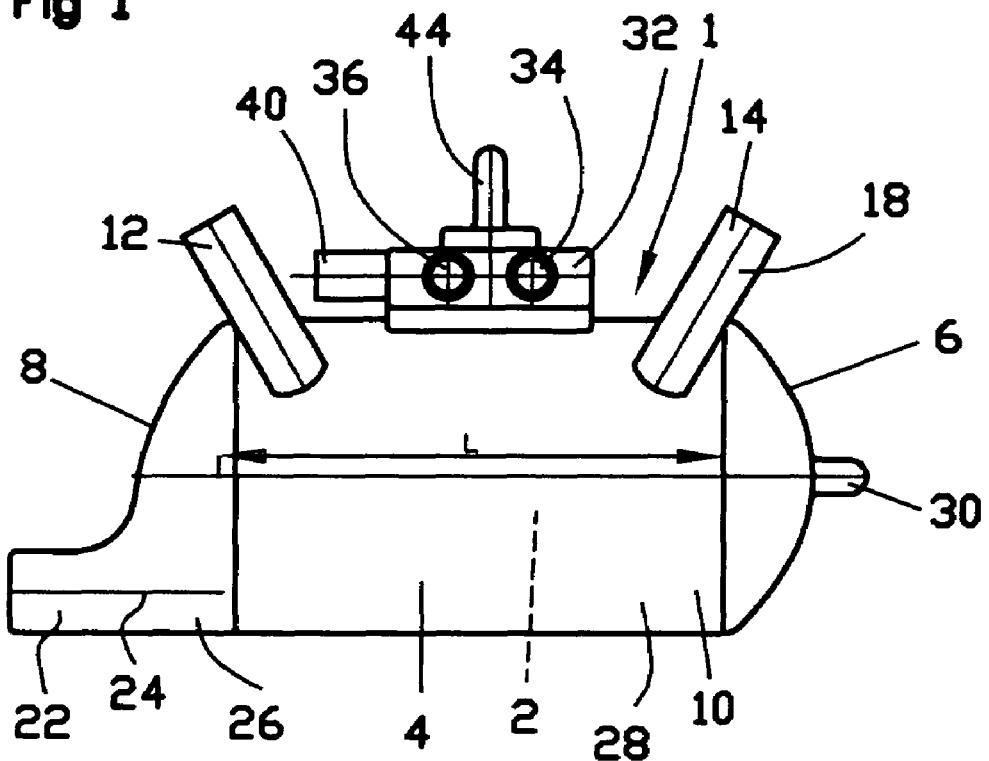
FIG. 1 shows a diagrammatic side elevation of a first embodiment of a milking claw.
Figure 2:
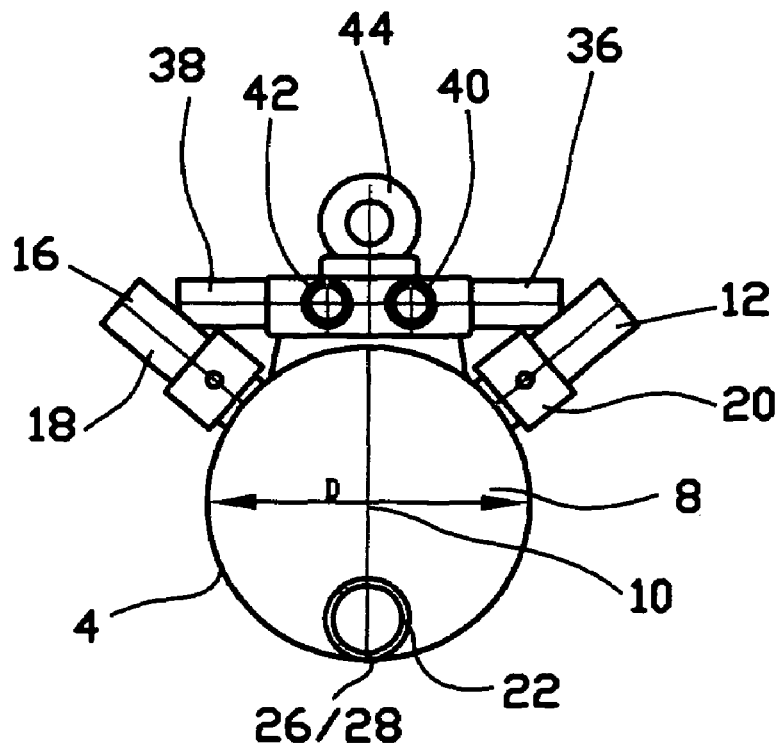
FIG. 2 shows a front view of a variant of the embodiment shown in FIG. 1.

The first embodiment of a milking claw 1, shown in FIGS. 1 and 2, has a milk collection space 2 which is bounded essentially by a tube section 4 and two end pieces 6, 8 fitted on it at the front. As can be seen in FIG. 2 in particular, tube section 2 has a roughly circular cross-section in the embodiment shown. In principle, however, any other cross-sectional shapes may be used, e.g. an oval cross-section. Both end pieces 6, 8 are designed roughly dome-shaped according to FIG. 1, the vertex lying roughly in a longitudinal axis 10 of the milking claw. In the embodiments shown axial length L of tube section 4 is greater than its diameter D (FIG. 2).

The figures show milking claw 1 in the installation position in which longitudinal axis 10 runs roughly parallel with or slightly inclined to the base. In the embodiment shown in FIGS. 1 and 2 four milk inlet connection are formed in the jacket region of tube section 4 lying above this installation position, of which only the milk inlet connections denoted by the references 12 to 16 are shown in the representations in FIGS. 1 and 2. In the representation shown in FIG. 2 is covered by milk inlet connection 16, and in the representation according to FIG. 1 by milk inlet connection 14. In the side elevation shown in FIG. 1, milk inlet connections 12 discharge roughly obliquely to the radial plane of the tube section, wherein axes 18 of the two milk inlet connections (12, 16 and 14, and of the milk inlet connections that are not visible), arranged on one end section of tube section 4, intersect in the region of longitudinal axis of tube section 4 that in FIG. 2 runs perpendicularly to the reference plane. The clearance angle to the radial plane (FIG. 1) of milk inlet connections 12, 14, 16 is selected so that the milk flow can enter milk connection space 2 without swirling, and for weight optimisation the end sections of milk inlet connections 12, 14, 16 in the representation according to FIG. 1, on the milk hose side, is oriented outwards so that the short milk hoses run to a certain extent from the outside to the milking claw.

As seen in the front view shown in FIG. 2, a displaceable stop 20 is arranged on each of milk inlet connections 12, 14, 16, this stop determining the mounting length of each short milk hose. In most cases milking claw 1 is orientated in the direction of the longitudinal axis of the animal when the milking unit is attached, wherein the end piece 8 is orientated forward toward the head of the animal, and end piece is orientated rearward toward the back of the animal. Here the milk flows out of milking claw 1 via end piece 8. To support this discharge, and in doing so optimise the weight distribution of the milking unit, the mounting length of the milk hoses can be shortened by stops 20 to the front milk inlet connections 12, 16, so that milking claw 1 is suspended so that it falls somewhat in the forward direction (on the left in FIG. 1). Furthermore, it is possible to adapt to different udder shapes by altering the mounting length of the milk hoses. This is necessary, for example, in the case of a stepped udder, where the rear udder quarters are arranged lower than the front udder quarters. Previously this was compensated for by providing milk hoses of different lengths.

The milk flows out of milk collection space 2 via a milk outlet connection 22 connected to the long milk hose, which connection is integrated in the left (front) in the embodiment shown. In the embodiment shown in FIGS. 1 and 2, connection axis 24 of milk outlet connection 22 runs parallel with longitudinal axis 10, wherein base region 26 of milk outlet connection 22 (see FIG. 1) crosses flush into base 28 of tube section 4, so that swirl-free discharge of the milk is guaranteed. As can be seen in FIG. 2 in particular, milk outlet connection 22 lies at the lowest point of tube section 4 and end piece 8 to prevent accumulation of the milk.

A retaining lug 30 is formed on the right end piece 6 shown in FIG. 1.

On the upper side, i.e. the side of tube section 4 facing the udder, is arranged a connecting piece 32 on which are provided four pulse nozzles 34, 36, 38 (the fourth pulse nozzle is again not visible) for the connection of a short pulse hose opening into the associated intermediate milking cup space. The connection to the pulsator is made by two pressure connections 40, 42, to which are connected long pulse hoses leading to the pulsator. A further lug 44 is provided on connecting piece 32 for suspending milking claw 1. In the embodiment shown in FIGS. 1 and 2, the axes of pulse nozzles 34, 36, 38 and of the pressure and suction connections 40, 42 run roughly in a common horizontal plane arranged parallel with longitudinal axis 10.

Milking claw 1 described above may be manufactured extremely simply from injection moulded parts, where both end pieces 6 can be designed transparently, at least in sections, so that the milk flow can be observed. End pieces 6, 8 are connected detachably to tube section 4 for simpler cleaning of milking claw 1—this is explained in even greater detail in the following.

Figure 3:
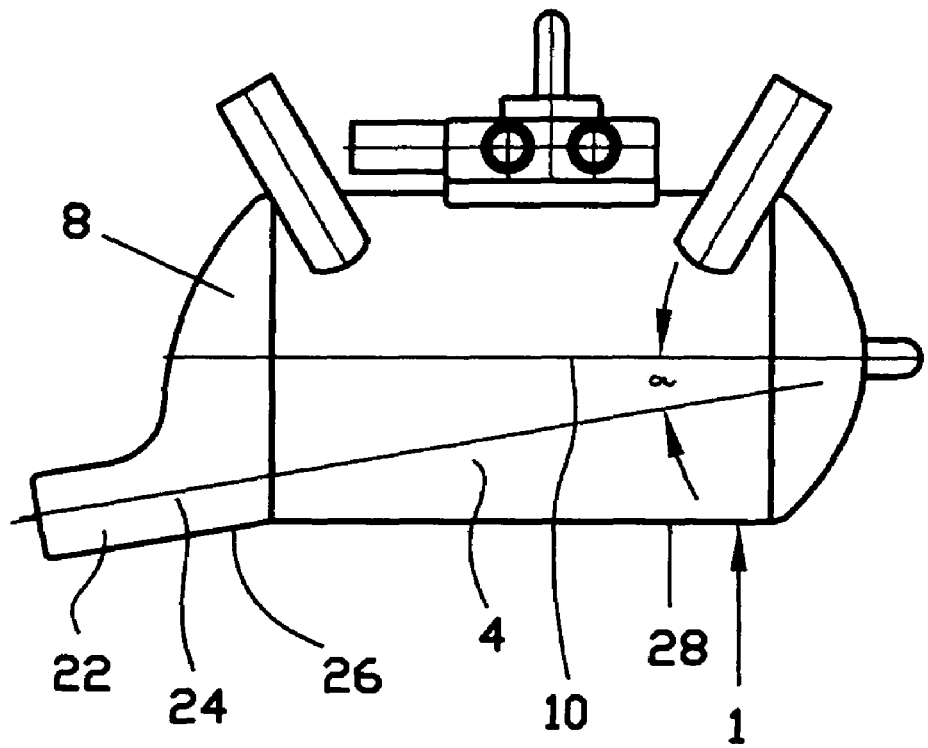
FIG. 3 shows a side elevation of a variant of the embodiment in FIG. 1, with an inclined outlet connection.

FIG. 3 shows a variant of the embodiment represented in FIGS. 1 and 2, in which connection axis 24 of the milk outlet connection 22 is inclined slightly downwards (view shown in FIG. 3), i.e. toward the standing base of the animal to support the discharge of the milk. In this embodiment base region 26 of milk outlet connection 22 runs correspondingly at an angle of inclination into base 28 of tube section 4. Angle of inclination α may be as much as 30°. Moreover, the embodiment shown in FIG. 3 corresponds to that shown in FIG. 1.

Figure 4:
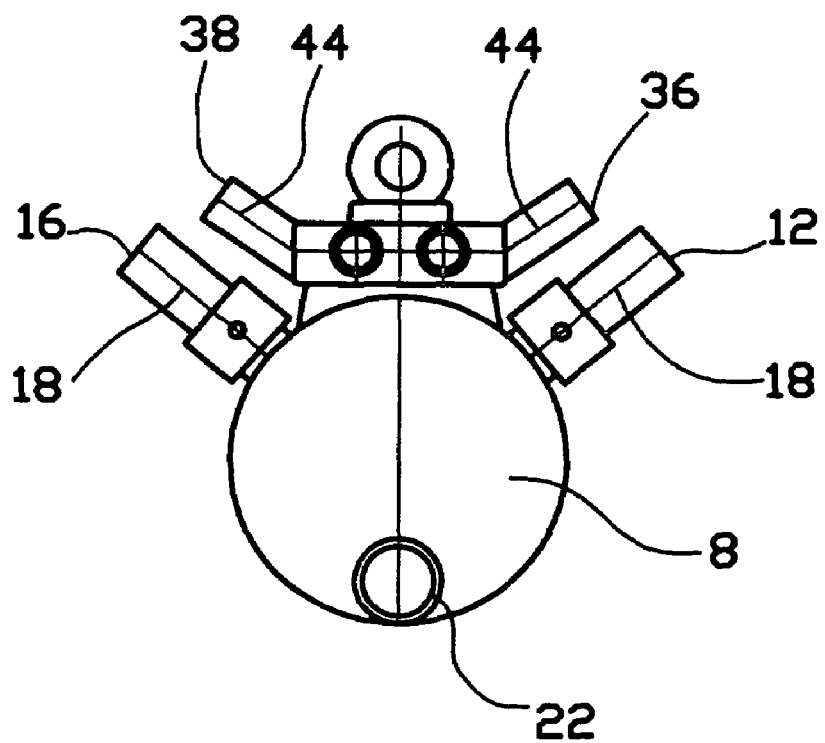
FIG. 4 shows a front view of a further embodiment.

FIG. 4 shows a variant of the embodiment shown in FIG. 2, in which pulse nozzle axes 44 of pulse nozzles 34, 36, 38 (and of the pulse nozzle not shown) run essentially with axis 18 of milk inlet connections 12, 14, 16 (and of the milk inlet connection not shown), again optimising the weight distribution and positioning of the milking cups. In one embodiment pressure connections 42, 44 remain arranged in the horizontal direction.

Preliminary tests already showed that an essentially swirl-free feed and discharge of the milk can be guaranteed with the geometry of milking claw 1 shown in FIGS. 1 to 4, so that the mechanical loading of the milk is minimal. The costs of manufacturing milking claw 1 consist of elements of comparatively simple construction are minimal compared to the conventional milking claws of highly complex construction, so that a low cost product with improved characteristics can be offered.

The milk flow can be further improved with the additional structural elements shown in the following figures.

Figure 5:
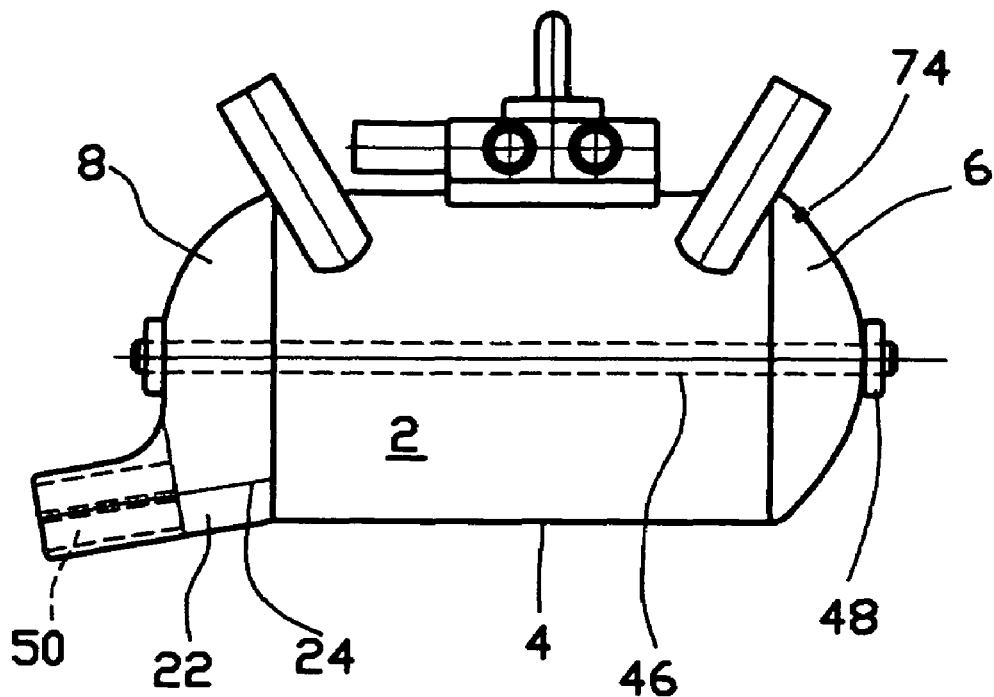
FIG. 5 shows a side elevation of an embodiment according to FIG. 3 in which two front end pieces are connected to each other by a tension rod, and in which a flow guide element is provided in the milk outlet connection.

The embodiment shown in FIG. 5 corresponds in terms of the essential structure to that shown in FIG. 3, with a milk outlet connection 22 inclined obliquely downwards. In this embodiment both end pieces 6, 8 are fastened to central tube section 4 by a tension rod 46 running coaxially with longitudinal axis 10 passing through milk connection space 2, by means of which rod both end pieces 6, 8 are clamped against tube section 4. The clamping is effected by means of at least one clamping screw 48 resting on the domed region of an end piece 6 and/or 8, which screw is screwed to an end section of tension rod 46 projecting axially from milking claw 1. Here end pieces 6, 8 are joined to tube section 4 by suitable centering elements and sealing elements so that milk collection space 2 is sealed in the predetermine relative position.

An outlet flow guide element 50, denoted by dotted lines, can e inserted in milk outlet connection 22 for optimising the discharge, which element divides milk outlet connection 22, for example into several flow chambers running in parallel with support axis 24, to prevent radial swirling of the milk in this region.

Figure 6:
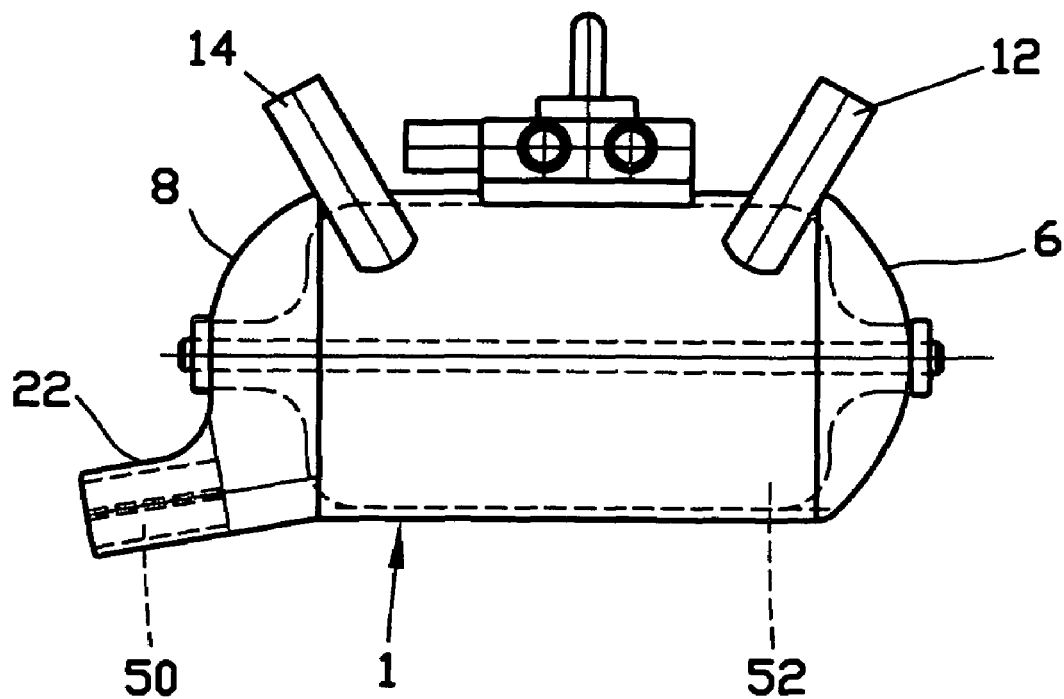
FIG. 6 shows an embodiment in which a further flow guide element is retained on the tension rod shown in FIG. 5.
Figure 7:
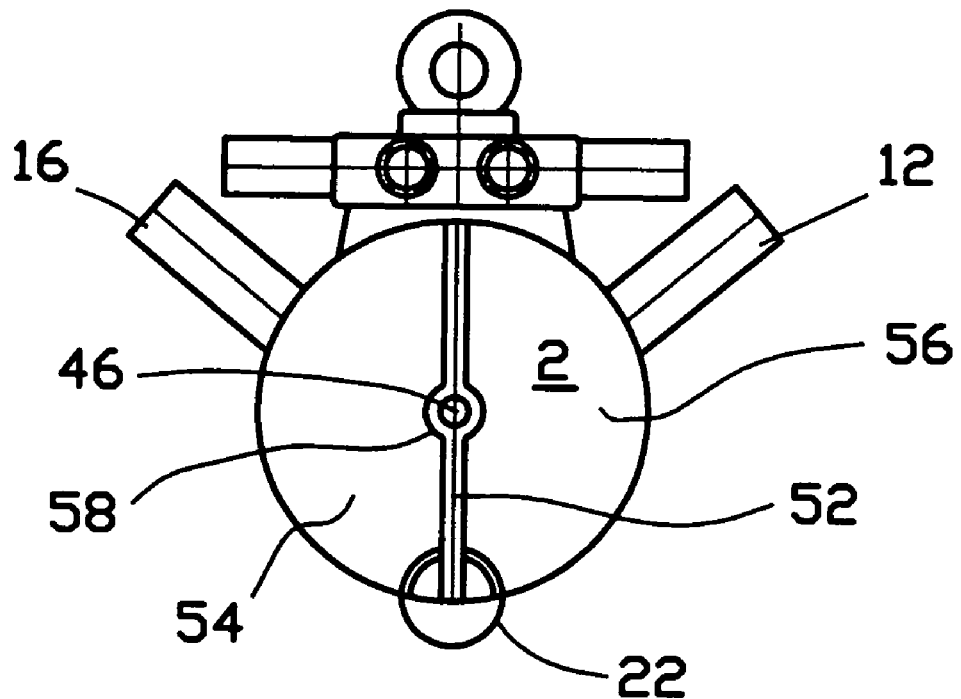
FIG. 7 shows an embodiment according to FIG. 6 in the side elevation, wherein the flow guide element is designed as a longitudinally running partition.

In the embodiment shown in FIGS. 6 and 7 milk collection space 2 is divided in the vertical direction (perpendicular to the standing base of the animal) by a roughly plate-shaped flow guide element 52 into two sub-chambers 54, 56, so that the milk flowing in via milk inlet connections 12, 14 is guided essentially along sub-chamber 56, and the milk flowing in via the other two milk outlet connections (18 and the milk outlet connections not shown) is guided along sub-chamber 54 as far as milk outlet connection 22.

As can be seen in particular in the side elevation of milking claw 1 shown in FIG. 6, plate-shaped flow guide element 52 is cut out in the region of both end pieces 6, 8, so that the milk can flow round it in this region. Consequently both milk flows are only combined in the region of both end pieces 6, 8. In the embodiments shown in FIGS. 6 and 7 plate-shaped flow guide element 52 is formed centrally with a hub through which tension rod 46 passes so that flow guide element 52 is retained by tension rod 46.

Figure 8:
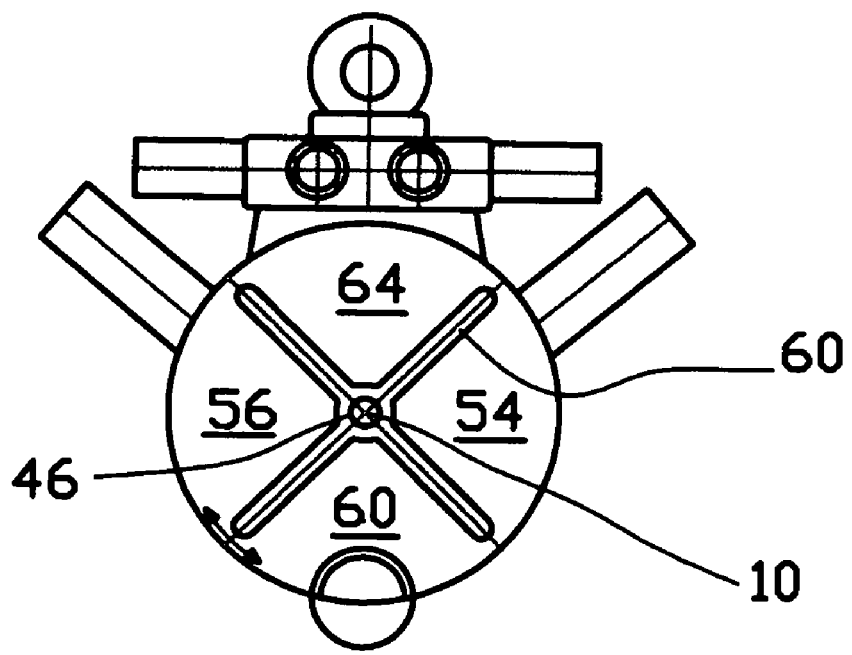
FIG. 8 shows a further embodiment according to FIG. 6 in the side elevation, wherein the flow guide element is of a cruciform design.

FIG. 8 shows an embodiment in which, instead of a plate-shaped flow guide element, use is made of a cruciform flow guide element 60, shown in the front view (FIG. 8) which also runs coaxially with longitudinal axis 10 of tube section 4 and is supported by retaining rod 46. The milk collection space is divided into four sub-chambers 54, 56, 64, 66 by this cruciform flow guide element 60, wherein the radially external end sections of flow guide elemen60 project in this embodiment a certain distance from the inner circumferential wall so that on the one hand the milk is guided in the longitudinal direction of tube section 4 by flow guide element 6, but a compensating flow in the direction of the arrow is made possible between sub-chambers 54, 56, 64, 66.

Figure 9:
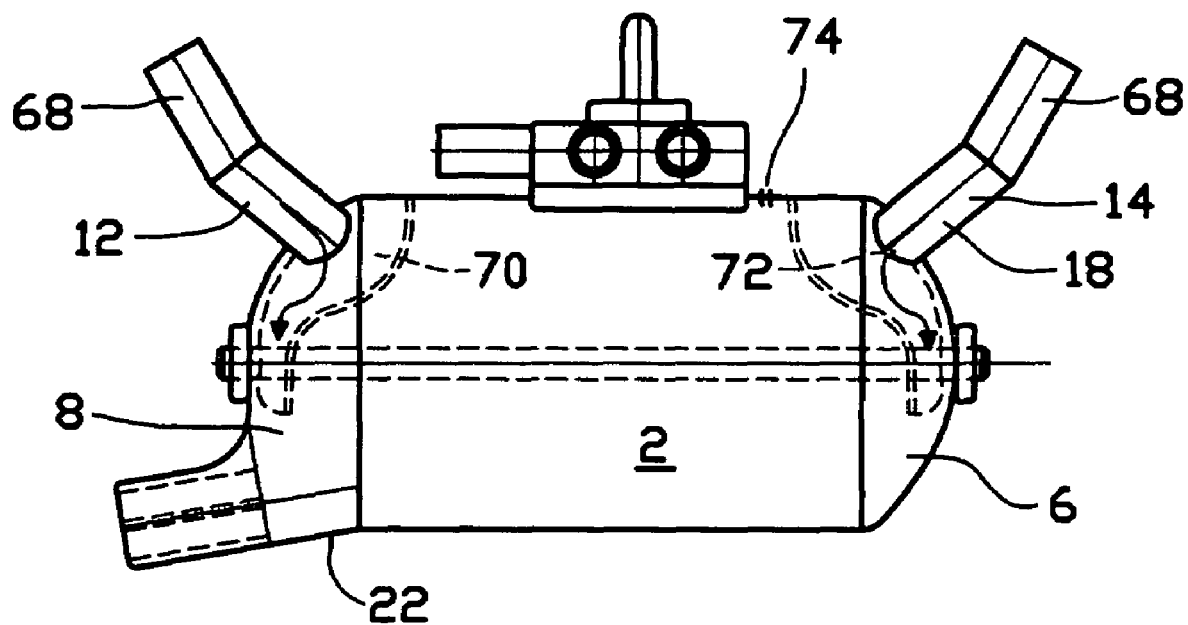
FIG. 9 shows a side elevation of a further embodiment in which the flow guide elements are arranged in the region of end pieces of the milking claw.
Figure 10:
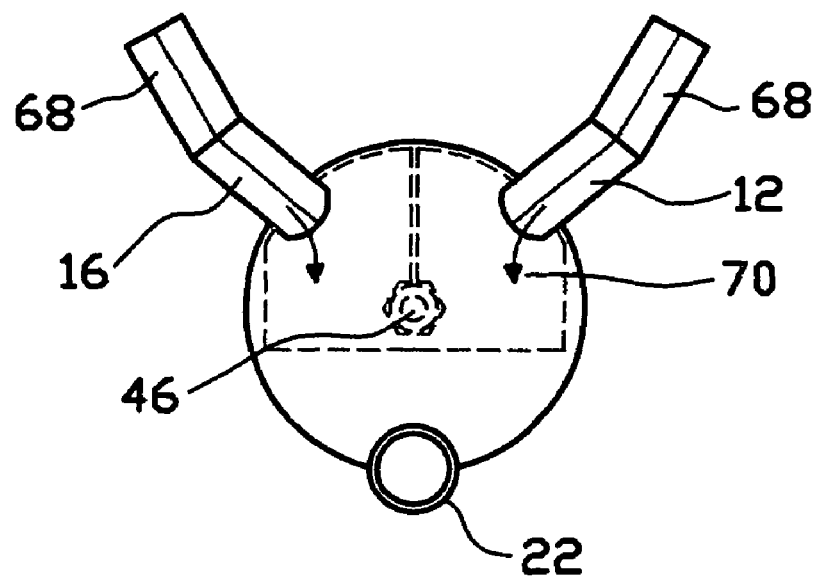
FIG. 10 shows the embodiment according to FIG. 9 in a simplified front view.

In the embodiments described above milk inlet connections 12, 14, 16 (and the milk inlet connection not shown) open into tube section 4. FIGS. 9 and 10 show an embodiment in which milk inlet connections 12, 14, 16 open into both end sections 6, 8, wherein milk inlet connection 12 and milk inlet connection 16 open into left end section 8, and the other two inlet connections open into right end section 6.

End sections 68 of milk inlet connections 12, 14, 16 can be angled relative to their axis 18 for optimising the equilibrium distribution, and in this case end sections 68 are positioned roughly in the vertical direction, so that the short milk hoses open into milking claw 1 so that it is suspended in the desired position relative to the animal.

In this embodiment flow guide elements 70, 72 are arranged on the end piece side in the region of end sections 6, 8, which elements ensure that the milk flow entering via milk inlet connections 12, 14, 16 is guided along the inner faces of end sections 6, 8 downwards in the direction of the milk outlet connection (see arrows in the side elevation shown in FIG. 1 and the front view shown in FIG. 10). Obviously several of the flow guide elements described above can be provided in any combination in a milking claw 1.

The function of the milking claw can be further improved if an air inlet jet 74 is provided, and if this air inlet nozzle 74, of small cross-section, is preferably provided, as shown in FIG. 9, in end section 6, in which no milk outlet connection 22 is installed.

In principle it is also possible to provide the distances between the pulse nozzles (for example 36, 38) or milk inlet connections (for example 12, 16) associated with one end section of milking claw 1, according to the animal breed, unlike the other two pulse nozzles or milk inlet connections, so that consideration is given to the fact that in the case of some animal breeds the rear teats are closer to each other that the teats facing towards the head. As already mentioned, the milk is discharged in most cases from milk collection space 2 in the forward direction toward the head of the animal, so that the front pulse nozzles 36, 38/milk inlet connections 12, 16 are then correspondingly further apart than the rear filling nozzles/milk inlet connections. Now if such a milking claw 1 is used in a milking parlour, in which the milk is discharged to the rear, milking claw 1 could indeed be easily rotated, but the adaptation to the distance between teats would then be lost. To avoid this, end sections 6, 8 are designed so that they can be exchanged and so that in the embodiment shown in FIGS. 9 and 10 the distance between the teats can also be allowed for in these milking parlours by replacing end pieces 6, 8. They may be replaced extremely easily by slackening the tension rod.

A milking claw for a milking unit is disclosed in which the milking claw has a tube section to which two end pieces are attached. The longitudinal axis of the tube section runs roughly in the horizontal direction, i.e. roughly in the longitudinal direction of the animal, or roughly parallel with the standing base of the animal. This longitudinal axis is in turn arranged in parallel with, or slightly inclined to a connection axis of a milk outlet connection. Because of this orientation of the milking claw, swirl-free feeding and discharging of the milk can be guaranteed.

LIST OF REFERENCES

1 Milking claw
2 Milk collecting space
4 Tube section
6 End section, right
8 End section, left
10 Longitudinal axis
12 Milk inlet connection
14 Milk inlet section
16 Milk inlet section
18 Axes
20 Stop
22 Milk outlet connection
24 Connection axis
26 Base region
28 Base
30 Retaining lug
32 Stop piece
34 Pulse nozzle
36 Pulse nozzle
38 Pulse nozzle
40 Pressure connection
42 Pressure connection
44 Pulse nozzle axis
46 Tension rod
48 Clamping screw
50 Outlet flow guide element
52 Plate-shaped flow guide element
54 Sub-chamber
56 Sub-chamber
58 Hub
60 Cruciform flow guide element
64 Sub-chamber
66 Sub-chamber
68 End sections
70 Flow guide element on the end section side
72 Flow guide element on the end section side
74 Air inlet nozzle

The invention claimed is:

1. A milking claw for a milking unit, the milking claw comprising:
    a milk collection space, into which milk inlet connections open, and from which milk can be discharged via a milk outlet connection, wherein
    the milk collection space is bounded in sections by a tube section, whose longitudinal axis in the milking position runs roughly in a horizontal direction,
    the milk collection space is limited at each end of the tube section by end sections which are mounted on the tube section,
    the milk outlet connection is integrated in one of the end sections,
    the longitudinal axis of the tube section is arranged above an opening of the milk outlet connection into the milk collection space,
    the end sections are clamped by a tension rod against the tube section, and
    the clamping is effected by a clamping screw resting on a domed region of each of the end sections, the clamping screw is screwed to an end section of the tension rod that projects axially from the milking claw.

2. The milking claw according to claim 1, wherein a clearance angle between the longitudinal axis of the tube section and an axis of the milk outlet connection is $\leq 30°$.

3. The milking claw according to claim 1, wherein a cross-section of the tube section is essentially circular or essentially oval.

4. The milking claw according to claim 1, wherein an axial length of the tube section is greater than its diameter.

5. The milking claw according to claim 1, wherein the milk inlet connections and/or the milk outlet connection open into the tube section and/or into the end section.

6. The milking claw according to claim 1, wherein the milk inlet connections open into an upper region of the milk collection space in the milking position.

7. The milking claw according to claim 1, wherein the end sections are designed transparently, at least in sections.

8. The milking claw according to claim 1, wherein flow guide elements are arranged in the milk collection space or in the milk inlet connections and the milk outlet connection, such that through the flow guide elements milk flow is guided in a predetermined manner in the milk collection space or in the milk inlet connections and the milk outlet connection.

9. The milking claw according to claim 8, wherein the tension rod serves to support at least one flow guide element.

10. The milking claw according to claim 1, wherein an air inlet nozzle is formed in one of the end sections having the milk outlet connection and the other end section.

11. The milking claw according to claim 1, wherein the end sections are replaceably secured to the tube section.

12. The milking claw according to claim 1, further comprising pulse nozzles whose pulse nozzle axis runs parallel or inclined to an axis of the milk inlet connections.

13. The milking claw according to claim 12, wherein the pulse nozzles are arranged roughly centrally at the top on the tube section.

\* \* \* \* \*